UNITED STATES PATENT OFFICE.

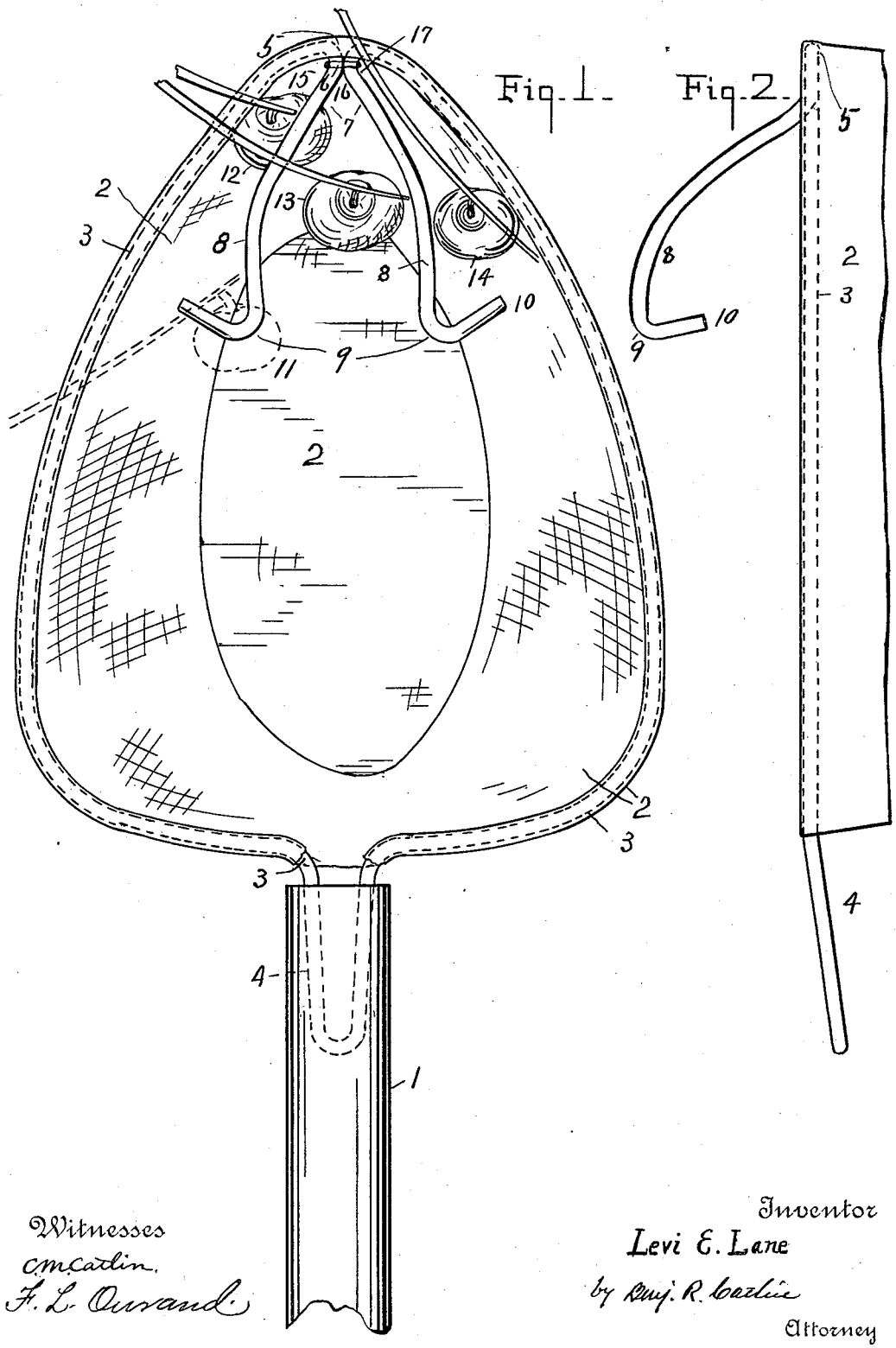

LEVI EGBERT LANE, OF LYONS, NEW YORK, ASSIGNOR OF ONE-HALF TO GEORGE F. MUNN, OF SAME PLACE.

FRUIT-GATHERER.

SPECIFICATION forming part of Letters Patent No. 606,062, dated June 21, 1898.

Application filed December 18, 1897. Serial No. 662,455. (No model.)

*To all whom it may concern:*

Be it known that I, LEVI EGBERT LANE, a resident of Lyons, in the county of Wayne and State of New York, have invented certain new and useful Improvements in Fruit-Gatherers; and I do hereby declare the following to be a full, clear, and exact description of the invention, such as will enable others skilled in the art to which it pertains to make and use the same.

The invention relates to fruit-gatherers consisting of a bag having its mouth held open by a wire rim or frame provided with stem-breaking devices and a handle; and its objects are to simplify the construction and increase its efficiency.

The invention consists in the matters hereinafter described and pointed out.

In the accompanying drawings, Figure 1 is a plan of the gatherer, the handle being partly broken away. Fig. 2 is a broken elevation of the same without the handle.

Numeral 1 denotes a handle, preferably about four feet in length.

2 indicates a bag or fruit-receptacle.

3 is a bag-rim made of a continuous piece of wire the main part of which is bent into a pear-shaped form and provided at its base with a stem-like bend or tang 4 to be inserted in and secured to the end of the handle. This tang, being integral with the rim and bent double, affords means for a firm and solid connection between the rim and handle.

On the side of the bag-mouth opposite the handle each end 5 of the wire is bent back inwardly toward the handle. The backwardly-bent wires are contiguous at the front of the rim and bag-mouth and are preferably bound together with fine wire 6. Said wires 5 beyond their point of contact and toward their free ends are curved apart and each bent toward its side of the rim at 7. At 8 they are curved upwardly or in a plane transverse to that of the rim, as indicated in Fig. 2, and at 9 they are bent back toward the front of the bag to form hook-like terminals 10.

Each hook 10 is adapted to engage the stem of any fruit—such as an apple, for example—and break or sever its connection with the tree-limb by a push, the said apple having been first brought over the receptacle 2 by an endwise or an end-and-sidewise movement of the rim. The situation of the fruit and stem immediately before their severance in the manner stated is indicated at 11 by dotted lines. The same movement which gathers the apple at 11 may also carry the widest part of the bag under one or more apples 12, 13, and 14, and in such relation thereto that the bag-rim can be drawn back and engage a stem in one, two, or three hooks or recesses 15, 16, and 15, as indicated, and break them by a pull. Thus by a forward-and-return movement four apples may be gathered, or even five, if both hooks 10 be utilized. If, however, but one be picked by the push and one or two by the return pull, the operation will be advantageous, as the fruit is gathered by the hooks both going and coming; but aside from this it is of practical importance that hooks for gathering fruit, part by a forward movement and part by a contrary movement, are situated near each other and near the narrow front of the bag, whereby either can be used and a choice made and carried out with a comparatively slight extent of movement and without the necessity of thrusting the bag-mouth beyond the point of attachment of the fruit gathered. The so-called "hooks" being grouped near the forward end of the rim diminishes the difficulty of pushing it among and through the twigs and limbs and foliage to reach the fruit. Pickers or hooks situated near the handle—that is, near the base of the bag-rim—are objectionable for the reason that the main body of the rim and bag and their widest part must be carried beyond the fruit in order that the pickers or hooks may engage the stems and then pushed still farther to pick the fruit.

The forward end of the improved bag-rim is made narrow or pointed to facilitate its forward passage among twigs, leaves, and fruit, and it is made wider toward the handle to adapt it to underrun several apples preparatory to engaging their stems by retracting the rim, said stems being entered under the wires either along the rim on either side or between the free ends at 8 and 7.

The object of each bend at 8, transverse to the bag-mouth, is to adapt the wire to ride over the side of an apple or other fruit and engage its shoulder adjacent the stem to hold it within the bag-mouth. This is specially useful when, as will sometimes be found convenient, the gatherer is inverted in order to suitably engage the stem and then reverted preparatory to gathering the fruit into the bag.

The gatherer described may be used from the ground; but such operation requires a long handle and is tiresome. The device is primarily intended to be used with a short handle and from a ladder. The ladder or the like being suitably placed under or against the tree, fruit that is somewhat remote from the selected position can, if desired, first be picked by the gatherer and the bag subsequently filled by hand-picking of fruit that is nearer, the gatherer being meantime suspended on a ladder-round by the picking-hooks. In other cases fruit near the ladder can first be picked by hand or otherwise and sent to the ground and then the more remote gathered by the described device.

It is characteristic of the improvement that it groups so-called "hooks," adapted part of them to pick by a push and part by a pull, near the forward end of the bag-rim and reduces to a minimum the weight of a rim provided with hooks having such capacity.

Heretofore fruit-gathering bags provided with approximately ovoid or pear-shaped rims have been provided with stem-breaking recesses at opposite ends. In such constructions it is necessary to move the rim substantially its whole length or more in order to push off an apple and immediately thereafter pull off another situated laterally adjacent, and in all cases to push off an apple it is necessary to thrust nearly the entire rim beyond the apple before its stem can be reached by the picking recesses or fingers. By my improvement reversely-situated stem-receiving and apple-picking recesses are situated near the forward end of the rim, which is made small to enter easily among leaves, twigs, and fruit. The picking-recesses being thus situated can be used to pick fruit by pulling and pushing, alternately moving the rim comparatively a small distance and in many cases without moving the largest part of the rim beyond or even to the limb from which the fruit is picked.

Having described my invention, what I claim is—

1. In a fruit-gatherer, a bag having a rim formed of wire provided with inturned ends joined together and extended backward from their junction to a situation over the bag mouth and rim and having free ends formed into forwardly-extending hooks, substantially as described.

2. In a fruit-gatherer, a bag having a rim formed of wire provided with inturned ends joined together and extended backward from their junction to a situation over the bag mouth and rim and having free ends formed into forwardly-extending hooks, said backward wire extensions having bends 8, substantially as described.

3. In a fruit-gatherer, a bag, a rim therefor, hooks situated at the forward end of the rim and integral therewith to engage the stem of the fruit and detach it by a pull, and means integral with said hooks for detaching the fruit from its stem by a push, said means being situated at said forward end above and over the bag-mouth, substantially as described.

4. In a fruit-gatherer, a bag provided with a handle and with a rim having stem-breaking hooks situated at the front end of the rim, and adapted to engage and break stems by a pull, and reversely-situated hooks near the front end of the rim and over the bag adapted to engage and break stems by a push, the mouth of the bag between the latter hooks and handle being unobstructed, substantially as described.

In testimony whereof I have signed this specification in the presence of two subscribing witnesses.

LEVI EGBERT LANE.

Witnesses:
THAD COLLINS, Jr.,
EDNA M. MILLER.